US008849329B2

(12) United States Patent
Hegde

(10) Patent No.: US 8,849,329 B2
(45) Date of Patent: Sep. 30, 2014

(54) TRANSMISSION RESOURCE MANAGEMENT

(75) Inventor: Nidhi Hegde, Paris (FR)

(73) Assignee: Orange, Paris (FR)

( * ) Notice: Subject to any disclaimer, the term of this patent is extended or adjusted under 35 U.S.C. 154(b) by 290 days.

(21) Appl. No.: 12/920,172

(22) PCT Filed: Feb. 6, 2009

(86) PCT No.: PCT/FR2009/050192
§ 371 (c)(1),
(2), (4) Date: Aug. 30, 2010

(87) PCT Pub. No.: WO2009/112728
PCT Pub. Date: Sep. 17, 2009

(65) Prior Publication Data
US 2011/0009146 A1   Jan. 13, 2011

(30) Foreign Application Priority Data
Mar. 5, 2008 (FR) ..................... 08 51423

(51) Int. Cl.
*H04B 7/00* (2006.01)
*H04W 72/04* (2009.01)
*H04W 64/00* (2009.01)
*H04W 28/18* (2009.01)

(52) U.S. Cl.
CPC .......... *H04W 72/048* (2013.01); *H04W 64/006* (2013.01); *H04W 28/18* (2013.01)
USPC ......... 455/509; 455/63.1; 455/63.3; 455/512; 455/450; 455/451; 370/320

(58) Field of Classification Search
None
See application file for complete search history.

(56) References Cited

U.S. PATENT DOCUMENTS

| 5,396,645 | A | 3/1995 | Huff | |
|---|---|---|---|---|
| 6,449,490 | B1 | 9/2002 | Chaponniere et al. | |
| 7,796,550 | B2* | 9/2010 | Ware et al. | 370/329 |
| 7,826,796 | B2* | 11/2010 | Matsunaga | 455/63.3 |
| 7,990,859 | B2* | 8/2011 | Ishii et al. | 370/230 |
| 8,045,924 | B2* | 10/2011 | Cho et al. | 455/63.1 |
| 2010/0240356 | A1* | 9/2010 | Lee et al. | 455/422.1 |

FOREIGN PATENT DOCUMENTS

| EP | 1753179 A1 | * | 2/2007 |
|---|---|---|---|
| EP | 1871030 A1 | * | 12/2007 |
| EP | 2015601 A1 | * | 1/2009 |

* cited by examiner

Primary Examiner — Fayyaz Alam
Assistant Examiner — Mohammed Rachedine
(74) Attorney, Agent, or Firm — Drinker Biddle & Reath LLP

(57) ABSTRACT

A communication network comprises a management entity adapted for allocating a transmission resource to a terminal from a plurality of terminals. A mobility value is associated with each terminal of the plurality of terminals, this mobility value indicating a level of mobility of a terminal in the communication network. Next, a terminal is selected from among the plurality of terminals on the basis of a characteristic relating to a condition of instantaneous transmission of the terminal and of a characteristic relating to a condition of mean transmission of the terminal, while taking account of the mobility value which is associated therewith. Thereafter, the transmission resource is allocated to the selected terminal.

9 Claims, 2 Drawing Sheets

TRANSMISSION RESOURCE MANAGEMENT

CROSS-REFERENCE TO RELATED APPLICATIONS

This application is the U.S. national phase of the International Patent Application No. PCT/FR2009/050192 filed Feb. 6, 2009, which claims the benefit of French Application No. 08 51423 filed Mar. 5, 2008, the entire content of which is incorporated herein by reference.

FIELD OF THE INVENTION

The present invention relates to radio transmission in communication networks, and more particularly the management of the radio transmission resources in such networks.

BACKGROUND

In this type of network, the transmission resources are radio channels. These transmission resources are allocated to the different terminals wanting to transmit data. At a given moment, a plurality of terminals can share the same radio channel which is then sliced into time slots or frequencies.

In this case, a network entity, such as for example a base station, is responsible for deciding on the scheduling of the traffic on this shared radio channel. To this end, when several terminals are capable of transmitting data over the same radio channel, at a given moment it selects one terminal in order to authorize it to access the transmission resource. This selection of a terminal can be carried out on the basis of different types of characteristics.

The document U.S. Pat. No. 6,449,490 describes such a terminal selection method which aims to maximize the quantity of data transmitted by all the terminals wanting to transmit data, whilst ensuring a certain level of fairness between the different terminals.

In this document, provision is made to associate with the terminals of a group of terminals wanting to transmit data, respective values on the basis of which it is possible to select the terminal to which the transmission resource is allocated. Such a value to be associated with a terminal takes account of both conditions of instantaneous transmission and conditions of mean transmission.

Then, under these conditions, the base station allocates a transmission resource to the terminal with which the highest value is associated.

Such a method for managing the scheduling of traffic makes it possible to obtain effective transmission resource management when the terminals are relatively immobile. However, it can be ineffective within a set of terminals the respective movements of which are not homogeneous. In fact, in this case, the conditions of mean transmission of a very mobile terminal can be very deceptive with respect to the current transmission conditions of the terminal. Under such conditions, it is possible to allocate a transmission resource to a terminal which was previously situated in good transmission conditions but is situated in poor transmission conditions at the time of allocation of the transmission resource. A management of the transmission resources is then obtained which may be ineffective.

The present invention will improve the situation in a communication network comprising mobile terminals.

SUMMARY

A first aspect of the present invention proposes a method for the management of transmission resources in a communication network comprising a management entity adapted for allocating a transmission resource to a terminal from a plurality of terminals;

said method comprising the following steps at the management entity:

/a/ associating a mobility value with each terminal of said plurality of terminals, this mobility value indicating a level of mobility of a terminal in the communication network;

/b/ selecting a terminal from among the plurality of terminals on the basis of a characteristic relating to a condition of instantaneous transmission of the terminal and of a characteristic relating to a condition of mean transmission of the terminal, while taking account of the mobility value which is associated therewith; and /c/ allocating the transmission resource to the selected terminal.

By means of these arrangements, the allocation of a transmission resource is advantageously carried out while taking account of the degree of mobility of the terminals, which makes it possible not to apply similar selection criteria to a very mobile terminal and to a relatively immobile terminal at the time of the allocation of the transmission resource.

This characteristic makes it possible in particular to avoid allocating a transmission resource to a terminal which is situated in poor radio conditions at the time of the allocation.

More precisely, it should be noted that a very mobile terminal, i.e. moving at a relatively high speed, can be subjected to rapid changes in the transmission conditions in which it is situated. Thus, for a very mobile terminal, to which a relatively high mobility value according to an embodiment of the present invention corresponds, the characteristic relating to a condition of mean transmission of the terminal cannot be representative of the condition of transmission in which the terminal is situated at the time of the allocation of the resource.

Thus, while taking account of the mobility values associated with the terminals, it is possible to promote a selection based rather on a characteristic relating to a condition of instantaneous transmission for the terminals with which relatively high mobility values are associated, therefore with strong mobility, and a selection based rather on a characteristic relating to a condition of mean transmission for the terminals with which relatively low mobility values are associated.

In an embodiment of the present invention a mobility value to be associated with a terminal is determined while taking account of at least one among a first value indicating a cell change frequency and a second value indicating a modulation and coding change frequency for the terminal during a given period of time.

It is possible for example to associate mobility values comprised between the value 0 and the value 1. Thus, the value 0 can represent the zero mobility of a terminal for which the cell change frequency and/or the modulation and coding change frequency for the terminal during a given period of time is zero; and the value 1 can represent the maximum mobility of a terminal for which the cell change frequency and/or the modulation and coding change frequency for the terminal during a given period of time is high.

Provision can be made to base the selection step on a selection value obtained from the characteristic relating to a condition of instantaneous transmission of the terminal, from the characteristic relating to a condition of mean transmission of the terminal and from the mobility value which is associated therewith.

Thus, in an embodiment of the present invention, a selection value $m_i(t)$ is determined for each terminal i of the plurality of terminals according to the following equation:

$$m_i(t) = \frac{r_i(t)}{(R_i(t))^{\alpha_{k(i)}}}$$

where $r_i(t)$ is a value of the instantaneous transmission rate of the terminal i;

where $R_i(t)$ is a value of the mean transmission rate achieved by the terminal i over a given period of time; and where $\alpha_{k(i)}$ is a parameter which varies inversely to the mobility value k(i) associated with the terminal i, when the mobility value increases with the mobility of a terminal.

The management entity then selects the terminal with which the highest selection value is associated.

Here, the characteristic relating to the condition of instantaneous transmission of the terminal is its instantaneous transmission rate, and that relating to the condition of mean transmission is its achieved mean transmission rate.

By proceeding in this way, the selection value is a combination of the instantaneous transmission rate and the mean transmission rate in which the mean transmission rate is represented to a greater or lesser degree as a function of the value of the parameter $\alpha_{k(i)}$ which is itself a function of the mobility of the terminals.

More precisely, since the value of $\alpha_{k(i)}$ varies inversely to the terminal mobility value, the selection value thus determined for a very mobile terminal is relatively unrepresentative of the characteristic of the condition of mean transmission with respect to the characteristic of the condition of instantaneous transmission, whereas the selection value determined for an immobile terminal represents relatively strongly the characteristic of the condition of mean transmission with respect to the characteristic of the condition of instantaneous transmission.

By varying the significance of the characteristic relating to a condition of mean transmission with respect to that relating to a condition of instantaneous transmission, it is possible to determine selection values which avoid the allocation of the transmission resources to a terminal which would be situated in poor transmission conditions due to a rapid movement not shown by the characteristic relating to the condition of mean transmission.

The communication network being a cellular network, the parameter $\alpha_{k(i)}$ can be a value which is fixed for each cell. Such a network configuration is advantageous when the mobility of the terminals in a cell is homogeneous, such as on a section of motorway for example, or also in a pedestrian zone. This procedure simplifies the implementation of a management method according to an embodiment.

It is possible to provide for the creation of classes of mobility, each class of mobility corresponding to a plurality of successive mobility values. The successive sets of successive mobility values k(i) then represent respective classes of mobility, and the parameter $\alpha_{k(i)}$ can then be a value fixed for each mobility class. If the mobility values are comprised between 0 and 1, it is then possible to provide ten classes of mobility, the first corresponding to the values comprised between 0 and 0.1, and so on up to the tenth class of mobility which corresponds to the mobility values comprised between 0.9 and 1.

Such an embodiment makes it possible to simplify the implementation of a management method according to an embodiment of the present invention, with respect to a configuration according to which the parameter $\alpha_{k(i)}$ varies at each different value of k(i).

The plurality of terminals, considered here, comprises terminals having required transmission resources at the level of the communication network and can be updated before each step /a/.

A second aspect of the present invention proposes a radio resource management entity adapted for implementing a method for the management of radio resources according to the first aspect of the present invention.

A third aspect of the present invention proposes a base station in a communication network adapted for allocating a transmission resource to a terminal among a plurality of terminals, said base station comprising a transmission resource management entity according to the second aspect of the present invention.

A fourth aspect of the present invention proposes a network controller in a communication network adapted for allocating a transmission resource to a terminal from among a plurality of terminals, said network controller comprising a transmission resource management entity according to the second aspect of the present invention.

A fifth aspect of the present invention proposes a computer program intended to be installed in a resources management entity according to the second aspect of the present invention, comprising instructions adapted for implementing the method according to the first aspect of the invention, during an execution of the program by processing means of the management entity.

BRIEF DESCRIPTION OF THE DRAWINGS

Other aspects, aims and advantages of the invention will become apparent on reading the description of one of its embodiments.

The invention will also be better understood with the help of the drawings, in which.

DETAILED DESCRIPTION

Figure 1:
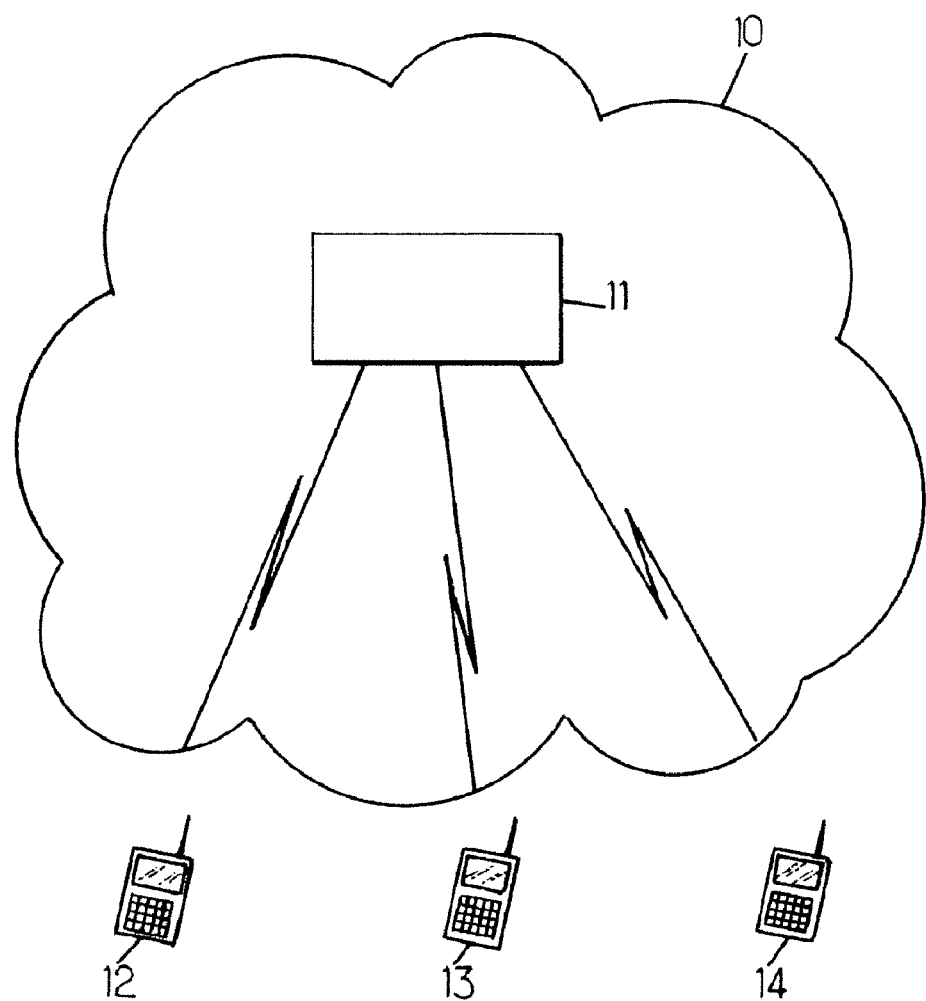
FIG. 1 illustrates a communication network according to an embodiment of the present invention.

FIG. 1 illustrates a communication network according to an embodiment of the present invention. This communication network comprises a management entity 11 which is responsible for scheduling the transmissions of data from a plurality of terminals 12 to 14.

This communication network 10 can be a mobile communication network in which all the terminals are mobile terminals. But there is no limitation on the type of terminal the transmissions of which can be managed by a management entity according to an embodiment of the present invention. In fact, it is possible that the transmission resources of the communication network 10 according to an embodiment of the present invention can be used by both mobile terminals and fixed terminals. In the latter case, the management entity 11 is then responsible for scheduling the use of the transmission resources between the terminals which can be mobile or fixed.

The management entity 11 manages the scheduling of the traffic within a plurality of terminals in order to authorize the terminals successively to access the transmission resources of the communication network 10.

Within the context of the present invention, provision can be made for sharing the same radio channel within a group of terminals having required a transmission resource, while managing the sharing of the radio channel either according to frequencies or according to time.

When the communication network 10 corresponds to a cellular mobile communication network, this management entity 11 can be situated at the level of one of the network entities provided in such an architecture, such as for example at the level of the base stations of this network, or also at the level of the network controllers (or RNCs for 'Radio Network Controllers' in the terminology of the UMTS standard).

However, provision can easily be made for this management entity 11 to be arranged elsewhere in the network, this management entity being able to be dedicated to the allocation of the transmission resources. In this case, a communication should be provided between a network entity which receives the transmission requests from the terminals and this management entity, since this latter entity determines, among the plurality of the terminals wanting to transmit data at a time t, that which is authorized to transmit.

Hereafter, by way of illustration, the present invention is described in its application to a cellular mobile communication network.

Moreover, also by way of illustration, the present invention is described in its application to a transmission resource allocation based on time. More precisely, the sharing of the use of the same radio channel by a plurality of terminals is based on a division of time into successive time slots of fixed length.

Figure 2:
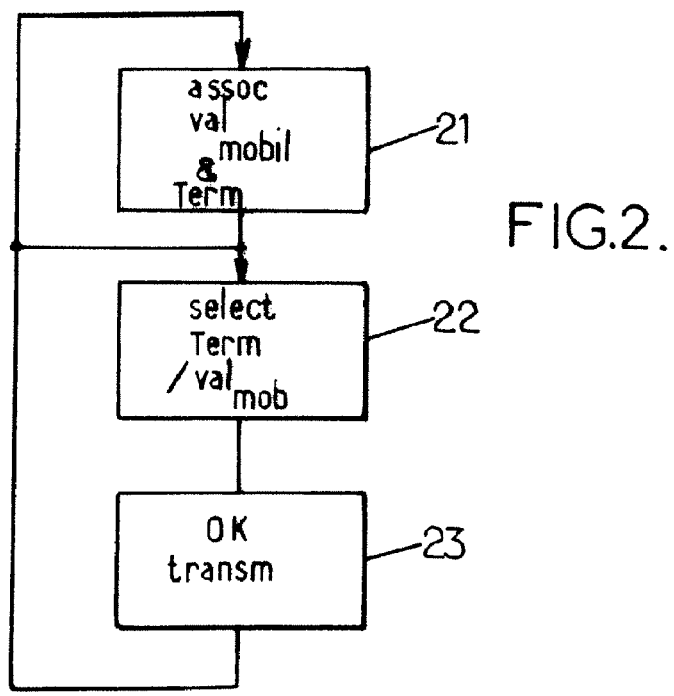
FIG. 2 illustrates the main steps of a management method according to an embodiment of the present invention.

FIG. 2 illustrates the main steps of a management method according to an embodiment of the present invention at the level of the management entity 11.

This management entity 11 is responsible for allocating a transmission resource, here for example a time slot, to a terminal from among a plurality of terminals wanting to transmit data at a time t in the same cell.

To this end, this management entity knows the plurality of terminals wanting to transmit data, i.e. all of the terminals which have data awaiting transmission in the cell considered.

In a step 21, the management entity associates a mobility value with each of the terminals wanting to transmit data. This mobility value k(i) is representative of a level of mobility for the terminal i with which it is associated. Provision can be made for a mobility value to be comprised between 0 and 1, and a mobility value equal to zero to be allocated to a terminal which is fixed and a value close to the value 1 to a terminal which has a high level of mobility.

Within the context of the application of the present invention to the cellular mobile communication network, the mobility of a terminal in the network can lead to a change of cell for the terminal ('handover'). In fact, when a terminal which is managed in one cell, therefore situated in the geographic coverage area of this cell, moves towards the coverage area of another cell, it can then be managed in this other cell. Such a change of cell for a mobile terminal makes it possible to guarantee radio cover despite the movement of the terminal in the network. It should be noted that the more mobile a terminal, i.e. the greater its movements, the more probable that its cell change frequency will be high. These changes of cell for a given terminal of the network are known at the level of the network and can be taken into consideration advantageously in order to determine a mobility value for a terminal according to an embodiment of the present invention.

Moreover, when a terminal is mobile the transmission conditions relating to the radio channel on which the terminal transmits can vary. The transmission conditions can sometimes be improved by changing modulation and coding for the transmission considered. Thus, at a given moment of the transmission, the transmission conditions can be acceptable with a certain modulation and a certain coding, then, in particular if the terminal moves, it is possible that, in order to maintain good transmission conditions, the application of another modulation and another coding will be required. Thus, the frequency of the change of modulation and coding associated with a transmission of a terminal can also be used in order to determine a mobility value to be associated with the terminal considered.

In the case of application of the present invention to the cellular mobile communication network, a mobility value can advantageously be determined as a function of the frequency of cell change to which the terminal was last subjected, for example over a defined period of time, and/or as a function of the frequency of change of modulation and coding to which the transmission of the terminal considered has been subjected, for example over a defined period of time.

The two characteristics relating to the transmission of a terminal can therefore advantageously be taken into account in the determination of a mobility value of a terminal in a mobile cellular network of the GSM (for 'Global System for Mobile communications') or UMTS ('Universal Mobile Telecommunications System') type for example.

However, it should be noted that there is no limitation on either the type of the characteristics, or the number of types of characteristics, that can advantageously be taken into account in order to estimate a level of mobility of a terminal according to an embodiment of the present invention.

Once a mobility value is determined for each of the terminals wanting to transmit data, the management entity 11 is then able, in a step 22, to select a terminal in order to allocate the next transmission resource to it.

To this end, it is here provided to apply a selection algorithm, or scheduling algorithm based on a selection value $m_i(t)$ for a terminal i.

Such a selection value can verify the following equation:

$$m_i(t) = \frac{r_i(t)}{(R_i(t))^{\alpha_{k(i)}}} \qquad (1)$$

where $r_i(t)$ is a value of the instantaneous transmission rate of the terminal i at time t;

where $R_i(t)$ is a value of the mean transmission rate achieved by the terminal i over a given period of time; and where $\alpha_{k(i)}$ is a parameter which varies inversely to the mobility value k(i) associated with the terminal i, when the mobility value increases with the mobility of a terminal.

The management entity then selects the terminal with which the highest selection value $m_i(t)$ is associated.

By selecting a terminal on the basis of such selection values, it is possible to apply so-called "alpha-fair" scheduling aimed at maximizing the value S of the sum of the transmission rates of the mobile terminals i verifying the following equation:

$$S = \sum_{i \in I} R_i^{1-\alpha_{k(i)}} / (1 - \alpha_{k(i)})$$

where I is the plurality of the terminals wanting to transmit over the same radio channel at the same time.

The value of the instantaneous transmission rate $r_i(t)$ can advantageously be estimated on the basis of quality measurements relating to the radio channel considered.

The value of the mean transmission rate $R_i(t)$ can be determined according to the following equation:

$$R_i(t)=(1-\alpha)R_i(t-1)+a.d_i(t-1) \qquad (2)$$

where $d_i(t-1)$ represents the transmission rate effectively achieved by the terminal i during the previous time slot (t−1), this transmission rate being equal to 0 if this terminal has not been selected during the time slot (t−1); and where a is an adjustment parameter relating to the effective past transmission rate of the terminal i, a generally being fixed at a low value.

Provision can be made to determine the same mobility value k(i) for a set of terminals of the plurality of terminals and thus create classes of mobility of terminals within the plurality of terminals for which the traffic is to be scheduled. A value of parameter $\alpha_{k(i)}$ can then be fixed for each class of mobility. Such a configuration of the value of parameter $\alpha_{k(i)}$ can be advantageous in a communication network for an urban area, in which the terminals can be subjected to very different movements and therefore be associated with different mobility values, since in an urban area the users of the terminals can move on foot, by car or also be stationary. In this case, the mobility value k(i) represents the class of mobility of the terminal i in the cell on which it depends.

Provision can also be made to fix a value of the parameter $\alpha_{k(i)}$ at the level of a complete cell. Such a case can be advantageous when the terminals within the cell have similar mobility levels, as may be the case in a cell covering a section of motorway in which the mobility levels of the terminals are similar, or also in a cell covering a supermarket in which the users of the terminals have similar movements. In this case, the value k(i) is representative of a type of cell on which the terminal i depends.

Whatever the method used to determine the value of the parameter $\alpha_{k(i)}$ relating to a terminal i, whether it is fixed for each cell, for example for cells which are homogeneous in terms of mobility of terminals, or also for each class of mobility of terminals, it is then possible to determine a value of the selection $m_t(i)$ at time t for each of the terminals i of the plurality of the terminals considered, according to equation (1).

This selection value $m_t(i)$ depends on the mobility value k(i) associated with the terminal i, since it depends on the value of the parameter $\alpha_{k(i)}$ which is itself a function of the mobility value k(i). As a result, the selection step described above is advantageously a function of the mobility value associated with each of the terminals of said plurality.

Then, in a step 23, the management entity decides to authorize the terminal i selected to use the transmission resource considered, i.e. the time slot t.

Before proceeding to a subsequent step, an update of the plurality of terminals is carried out. In fact, certain new terminals may have wanted to transmit data and other terminals may no longer want to do so.

Then, on the basis of an updated plurality of terminals, the management entity 11 can either return to step 21 aimed at associating a mobility value with each of the terminals of the plurality of the terminals which again want to transmit data, or proceed directly to step 22 by selecting a next terminal i on the basis of the mobility values already associated with the terminals awaiting a transmission resource in order to transmit.

Provision can be made to pass from step 23 to step 21, i.e. to reiterate the determination of the mobility values regularly over time, in order to rapidly take account of any changes in the level of mobility of a terminal.

It should be noted that if only one terminal wants to transmit in the time slot t, then the management entity 11 does not have to select a terminal on the basis of the selection values as defined according to equation (1), since the transmission resource can then be allocated to this single terminal requiring it.

Moreover, if no terminal has transmitted the wish to transmit data at the time of the allocation of the time slot t, then the management entity 11 passes to the following time slot t+1, and updates the possible plurality of terminals wanting to transmit data at time t+1.

In an embodiment of the present invention, the value of $\alpha_{k(i)}$ is determined at a value close to 1 for a terminal i which is fixed or virtually fixed. In fact, in this case, according to equation (1), the allocation of the transmission resource is carried out as a function of the ratio of the instantaneous transmission rate to the transmission rate achieved, which makes it possible to guarantee a certain balance between the rate achieved and fairness for relatively fixed terminals.

On the other hand, it is possible advantageously to determine a value of $\alpha_{k(i)}$ at a value close to zero for a very mobile terminal i. In fact, in this case, the selectivity value $m_i(t)$ then essentially represents the instantaneous rate of the terminal i, which avoids selecting a terminal which would not be in good radio conditions at the time of the allocation of the resource, by using an embodiment of the present invention.

In fact, in the case of a very mobile terminal, the transmission conditions which are specific to it can change very rapidly.

Thus, the mean transmission rate achieved by the terminal i, denoted $R_i(t)$ in equation (1), can represent transmission conditions very different from those in which the terminal i is situated at the present time t. Thus, in order to avoid selecting a very mobile terminal i which would be in poor conditions, it is preferable to determine a value close to 0 for the parameter $\alpha_{k(i)}$ in order to obtain selection values $m_i(t)$ essentially representing the present transmission conditions $r_i(t)$ of the terminal i.

Figure 3:
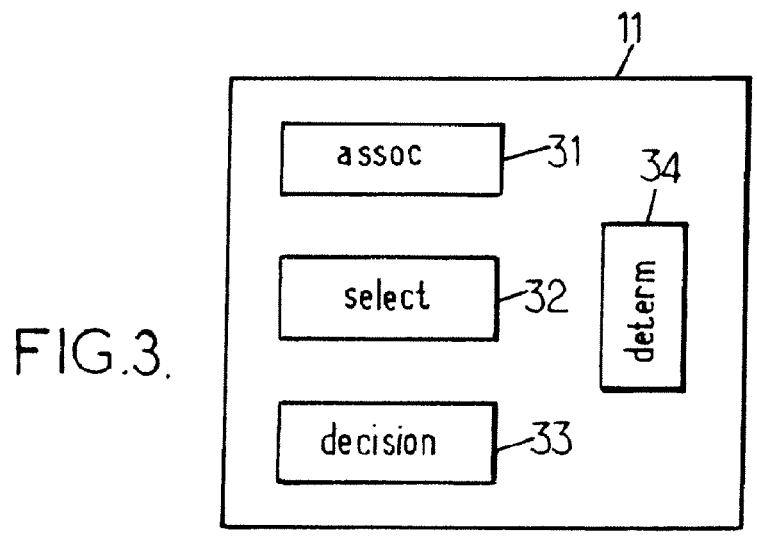
FIG. 3 illustrates an architecture of a transmission resource management entity according to an embodiment of the present invention.

FIG. 3 illustrates a transmission resource management entity 11 according to an embodiment of the present invention.

Such a transmission resource management entity 11 comprises, in an embodiment of the present invention, an association entity 31 adapted for associating a mobility value k(i) with each terminal of the plurality of terminals, this mobility value indicating a terminal mobility level in the communication network.

It comprises moreover a selection entity 32 adapted for selecting a terminal from among the plurality of terminals on the basis of a characteristic relating to a condition of instantaneous transmission of the terminal and a characteristic relating to a condition of mean transmission of the terminal, while taking account of the mobility value which is associated therewith.

It also comprises a decision entity 33 adapted for allocating a transmission resource to the terminal selected by the selection entity 32.

This transmission resource management entity 11 can moreover comprise a determination entity 34 adapted for determining a mobility value k(i) to be associated with a terminal while taking account of at least one of a first value indicating a cell change frequency and a second value indicating a modulation and coding change frequency for said terminal during a given period of time.

The determination entity 34 can moreover be adapted for determining a selection value $m_i(t)$ for each terminal i of the plurality of terminals according to the following equation:

$$m_i(t) = \frac{r_i(t)}{(R_i(t))^{\alpha_{k(i)}}}$$

where $r_i(t)$ is a value of the instantaneous transmission rate of the terminal i;

where $R_i(t)$ is a value of the mean transmission rate achieved by the terminal i over a given period of time; and where $\alpha_{k(i)}$ is a parameter which varies inversely to the mobility value k(i) associated with the terminal i, when the mobility value increases with the mobility of a terminal;

the management entity selecting the terminal with which the highest selection value is associated.

Such a management entity can correspond to any network entity of the architecture of the communication network considered, or also be an entity dedicated to the allocation of the transmission resource. It is in communication with a network entity which has access to the requests for transmission resources from the terminals.

Such a management entity can in particular be located at the level of a base station, i.e. at the level of a cell of the network, or also at the level of a network controller, i.e. at a higher level in the network architecture.

The invention claimed is:

1. A method for the management of transmission resources in a communication network comprising a management entity adapted for allocating a transmission resource to a terminal from a plurality of terminals, said method comprising the following steps at the level of the management entity:

/a/ associating a mobility value with each terminal of said plurality of terminals, said mobility value indicating a level of mobility of a terminal in the communication network, said mobility value being determined while taking account of at least one from among a first value indicating a cell change frequency and a second value indicating a modulation and coding change frequency for said terminal during a given period of time;

/b/ selecting a terminal from among the plurality of terminals on the basis of a selection value $m_i(t)$ relating to a condition of instantaneous transmission of the terminal and of a characteristic relating to a condition of mean transmission of the terminal, while taking account of the mobility value which is associated therewith; and /c/ allocating the transmission resource to the selected terminal;

wherein the selection value $m_i(t)$ is a combination of the instantaneous transmission rate and the mean transmission rate in which the mean transmission rate is weighted in function of the value of a parameter $\alpha_{k(i)}$ varying inversely to the mobility value k(i) associated with the considered terminal (i).

2. The management method according to claim 1, wherein the selection value $m_i(t)$ is determined for each terminal i of the plurality of terminals according to the following equation:

$$m_i(t) = \frac{r_i(t)}{(R_i(t))^{\alpha_{k(i)}}}$$

where $r_i(t)$ is a value of the instantaneous transmission rate of the terminal i;

where $R_i(t)$ is a value of the mean transmission rate achieved by the terminal i over a given period of time; and where $\alpha_{k(i)}$ is the parameter which varies inversely to the mobility value k(i) associated with the terminal i, when the mobility value increases with the mobility of a terminal; and wherein the management entity selects the terminal with which the highest selection value is associated.

3. The management method according to claim 2, wherein the communication network is a cellular network, the parameter $\alpha_{k(i)}$ is a value fixed for each cell.

4. The management method according to claim 2, wherein successive sets of successive mobility values k(i) represent respective classes of mobility, and wherein the parameter $\alpha_{k(i)}$ is a value fixed for each class of mobility.

5. A transmission resource management entity in a communication network adapted for allocating a transmission resource to a terminal from among a plurality of terminals, said management entity comprising:

a determination entity adapted for determining a mobility value to be associated with a terminal while taking account of at least one from among a first value indicating a cell change frequency and a second value indicating a modulation and coding change frequency for said terminal during a given period of time;

an association entity adapted for associating the determined mobility value to each terminal from said plurality of terminals, said mobility value indicating a level of mobility of a terminal in the communication network;

a selection entity adapted for selecting a terminal from among the plurality of terminals on the basis of a selection value $m_i(t)$ relating to a condition of instantaneous transmission of the terminal and of a characteristic relating to a condition of mean transmission of the terminal, while taking account of the mobility value which is associated therewith; and a decision entity adapted for a transmission resource to the selected terminal;

wherein the selection value $m_i(t)$ is a combination of the instantaneous transmission rate and the mean transmission rate in which the mean transmission rate is weighted in function of the value of a parameter $\alpha_{k(i)}$ varying inversely to the mobility value k(i) associated with the considered terminal (i).

6. The transmission resource management entity according to claim 5, wherein the determination entity is further adapted for determining the selection value $m_i(t)$ for each terminal i of the plurality of terminals according to the following equation:

$$m_i(t) = \frac{r_i(t)}{(R_i(t))^{\alpha_{k(i)}}}$$

where $r_i(t)$ is a value of the instantaneous transmission rate of the terminal i;

where $R_i(t)$ is a value of the mean transmission rate achieved by the terminal i over a given period of time; and where $\alpha_{k(i)}$ is the parameter which varies inversely to the mobility value k(i) associated with the terminal i, when the mobility value increases with the mobility of a terminal; wherein the management entity selects the terminal with which the highest selection value is associated.

7. A base station in a communication network adapted for allocating a transmission resource to a terminal from a plurality of terminals, said base station comprising the transmission resource management entity according to claim 5.

8. A network controller in a communication network adapted for allocating a transmission resource to a terminal from among a plurality of terminals, said network controller comprising the transmission resource management entity according to claim 5.

9. A non-transitory computer-readable storage medium with a program stored thereon, wherein the program comprises program code instructions for implementing the method according to claim 1.

* * * * *